3,065,231
PRODUCTION OF TRIALLYL ISOCYANURATE
Thomas C. Frazier, Jr., Hopewell, and Bernard H. Sherman, Chesterfield County, Va., assignors to Allied Chemical Corporation, New York, N.Y., a corporation of New York
No Drawing. Filed Aug. 6, 1958, Ser. No. 753,400
5 Claims. (Cl. 260—248)

This invention relates to an improved method for the production of triallyl isocyanurate:

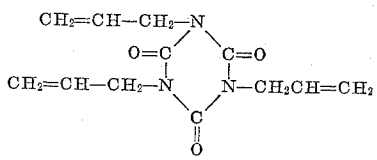

and related unsaturated alcohol triesters of isocyanuric acid.

Triallyl isocyanurate is a known compound having utility for a number of purposes. For example, it is a valuable insecticide. It is also a monomer which can be converted into resinous polymers and copolymers having high resistance to chemical action. The related alkenyl triesters of isocyanuric acid have similar utility.

Processes heretofore proposed for the manufacture of the alkenyl triesters of isocyanuric acid have not been satisfactory for a number of reasons. Thus, they have involved the use of expensive starting materials such as allyl alcohol, methallyl alcohol, ethylallyl alcohol and the like, or the use of special solvents which add to the initial cost of the process and require the inclusion of a solvent recovery procedure for their economical operation, such as acetonitrile.

An object of the present invention is to provide improvements in the method of manufacturing triallyl isocyanurate and related alkenyl triesters of isocyanuric acid from readily available and inexpensive raw materials, whereby such isocyanurates can be obtained in high yield.

Another object of the present invention is to provide improvements in the method of producing triallyl isocyanurate and related alkenyl triesters of isocyanuric acid from cyanuric acid and allyl and related alkenyl chlorides, whereby a high yield of triallyl isocyanurate or related alkenyl triester of isocyanuric acid can be obtained.

Additional objects in part will be obvious and in part will appear hereinafter.

When allyl chloride, methallyl chloride, ethallyl chloride or the like is reacted with cyanuric acid and an acid binding agent such as an alkali metal hydroxide (e.g. sodium hydroxide) in stoichiometrical proportions, only low yields of the corresponding triallyl isocyanurate are obtained owing to the fact that two competitive reactions take place: (1) the desired formation of the corresponding triallyl isocyanurate and (2) the undesired reaction between the chloride and the hydroxide to form an unsaturated alcohol. Besides, considerable time is required for completion of the desired reaction. This is true whether or not the cyanuric acid is first reacted with the hydroxide to form a cyanurate.

According to the present invention, the reaction of allyl chloride, or related alkenyl chloride (referred to in the claims as "2-alkene-1-monochloride") having the formula

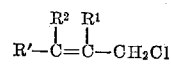

wherein R', R² and R³ are selected from the group consisting of hydrogen and lower alkyl, with cyanuric acid or an allyl or related alkenyl mono and/or diester of isocyanuric acid and an acid binding agent (or with a salt of cyanuric acid or of such mono- and/or diester) for the production of the corresponding triallyl or related isocyanurate is carried out in the presence of copper as a catalyst, and especially in a reaction mixture containing cuprous ions. In view of its solubility and compatibility with the unsaturated aliphatic chlorides, cuprous chloride is preferably employed.

We have discovered that the presence of copper has a surprising, beneficial effect upon the reaction. Thus we have found that the yield of triallyl isocyanurate is increased considerably by carrying out the reaction of allyl chloride with cyanuric acid and an acid binding agent (or with a salt of cyanuric acid) in the presence of copper as catalyst, for example, copper, a copper alloy or a copper salt. We have discovered that even the use of a stirrer for the reaction mixture which is formed of a copper alloy will accelerate the rate of reaction and increase substantially the yield of triallyl isocyanurate.

We have further found that the presence of cuprous ions in the reaction mixture is especially advantageous, and particularly when present in a molar ratio of at least 0.005 with respect to cyanuric acid (or salt thereof). For optimum results, the cuprous ion is preferably employed in a molar ratio of at least 0.01 with respect to cyanuric acid (or salt thereof).

Aside from the use of a copper catalyst, the known conditions for the production of triallyl isocyanurate and related unsaturated aliphatic triesters of isocyanuric acid from allyl chloride or other unsaturated aliphatic chloride and cyanuric acid (or related isocyanuric mono- or diester, or a salt of any of them) can be employed in the practice of the process of the present invention. Owing to the accelerating effect of the copper catalyst, however, the reaction period can be shortened considerably or milder reaction conditions can be employed than were used heretofore.

Thus, the allyl chloride or other alkenyl chloride can be added to an aqueous mixture of cyanuric acid, an acid binding agent (such as sodium hydroxide, potassium hydroxide or lithium hydroxide) and a copper salt (preferably a cuprous salt and especially cuprous chloride), and the mixture heated to produce triallyl isocyanurate or other alkenyl triester of isocyanuric acid.

The amount of allyl or other chloride relative to the amount of cyanuric acid or salt, and the amount of acid-binding agent may vary in keeping with the known processes. Preferably, an amount of allyl chloride, methallyl chloride, ethyl allyl chloride or the like greatly in excess of that theoretically required for the formation of the triisocyanurate is employed. Thus, at least 4 mols, and preferably 6 to 9 mols, of the chloride per mol of cyanuric acid are used.

An amount of alkali metal hydroxide is preferably employed such as to maintain the reaction mixture on the alkaline side of neutrality, and especially within the range pH 9 to pH 10.5. Thus, about 3 mols of sodium hydroxide per mol of cyanuric acid are preferably employed initially, and further alkali is added as needed, to maintain the desired alkalinity.

The temperature at which the reaction is carried out can be varied, depending upon the amount of catalyst employed and the pressure conditions. In order to secure a rate of reaction suitable for commercial operation, the reaction mixture is preferably heated to a temperature of at least 50° C., although lower temperatures may be used. The process can be carried out at atmospheric pressure or at higher pressures. At temperatures above 40° C. (for example, at temperatures of 45° to 100° C.), suitable reflux apparatus or operation in a closed reaction vessel is employed with allyl chloride in view of its volatility. At atmospheric pressure with about 0.01 mol cuprous chloride per mol of cyanuric acid, and with reflux of vaporized excess allyl chloride, a temperature of about 50° C. is preferred for the production of high yields of triallyl isocyanurate in a short reaction period.

It is a feature of the present invention that high yields of triallyl isocyanurate can be obtained in such a short reaction period as a half-hour and a temperature of only 50° C. under reflux conditions at atmospheric pressure.

When operating in a closed vessel at superatmospheric pressure, higher temperatures may be employed, e.g. 60–65° C. Lower temperatures, e.g. 40° C., require longer reaction periods.

If desired, the mono-, di- or trialkali metal salt of cyanuric acid may be employed instead of cyanuric acid and caustic alkali as the initial material, but the operation is more simply carried out by employing cyanuric acid and caustic alkali.

The amount of water used in forming the reaction mixture is not critical. Preferably an amount is employed which is sufficient to dissolve a major portion of the alkali metal cyanurate which forms.

The use of a copper catalyst may also be practiced in connection with the process of producing triallyl isocyanurate which is the subject of U.S. Patent 2,894,950 of Billy E. Lloyd and Fred L. Kelly and in which the reaction between allyl chloride and cyanuric acid is carried out in an aqueous reaction medium which is initially alkaline, but which contains less than the stoichiometric proportion of alkali, more particularly not more than 2 mols, and preferably not more than 1½ mols, of caustic alkali per mol of cyanuric acid, the allyl chloride is added in a total amount greatly in excess of that theoretically required, and is preferably added gradually as consumed, and alkali is added during the course of the reaction; the total amount of allyl chloride preferably being equal to at least 5 mols per mol of cyanuric acid employed, and for best results, at least 6 mols per mol of cyanuric acid; and the total amount of alkali being equal to at least 3 mols per mol of cyanuric acid and preferably being sufficient to maintain the by-products of the reaction in solution, and the alkali preferably being added in such amounts as to maintain the alkalinity of the reaction mixture substantially within the range pH 9.5 to pH 11 substantially throughout the reaction, and especially at pH 10 to pH 10.5.

The process also can be carried out with the alkenyl mono- or diester of isocyanuric acid as starting material, if desired, since the copper catalyst is especially effective in the conversion of the diester to the triester. Thus, allyl chloride can be reacted with cyanuric acid and an alkali metal hydroxide in the absence of a copper catalyst, to form the mono- and/or diallyl isocyanurate; a copper catalyst (such as, copper or cuprous chloride) can be added, and the reaction mixture can be further reacted with allyl chloride to form triallyl isocyanurate. Or diallyl isocyanurate prepared in any other desired manner can be reacted with allyl chloride in the presence of a copper catalyst to form triallyl isocyanurate.

Triallyl isocyanurate, which is an oil at ordinary atmospheric temperature, can be recovered from the reacted mixture in any suitable manner; as by stratification and separation from the aqueous portion of the reacted mixture, or by extraction of the reacted mixture with an organic solvent, for example, benzene or heptane.

For the preparation of a substantially pure triallyl isocyanurate, the product is subjected to a final distillation at a low pressure (high vacuum). The product also may be purified in other ways; for example by flash evaporation of volatile impurities, crystallization from solvents, treatment with activated charcoal, or washing with dilute aqueous ammonia.

If it is desired to recover unreacted allyl or other alkenyl chloride and/or the by-product allyl or other unsaturated alcohol formed by the reaction of the chloride with the acid binding agent, this can be done preferably by distilling off an azeotrope of water with the chloride and/or alcohol from the reacted mixture at subatmospheric pressure prior to recovery of the isocyanurate.

The reacted mixture usually contains, besides the triester of isocyanuric acid, lesser amounts of the corresponding alkenyl diester of isocyanuric acid, formed as a by-product, which is usually left behind in the mixture in the form of its salt when the triester is removed, and which can be recovered, if desired, by acidifying the mixture. Thus, in the case of triallyl isocyanurate the diallyl isocyanurate formed as a by-product of the reaction can be recovered, after removal of the triallyl isocyanurate, by acidifying the aqueous alkaline solution, e.g. with dilute sulfuric acid and separating solid diallyl isocyanurate, e.g. by filtration.

If desired, the diallyl isocyanurate can be added to the cyanuric acid employed as starting material or can itself be used as starting material instead of cyanuric acid.

The invention will be illustrated by the following specific examples, but it is to be understood that the invention is not limited to their details and that changes may be made without departing from its scope. The temperatures are in degrees centigrade and the parts and percentages are by weight, unless designated as parts by volume. Where parts are by volume, the amount signifies the volume occupied by the same number of parts by weight of water at 4° C.

*Example 1*

A reaction vessel which was provided with a stirrer, reflux condenser and thermometer was charged with an alkaline aqueous cyanurate solution (60 parts of sodium hydroxide, 800 parts of water and 65 parts of cyanuric acid), and externally heated to 50°. Solid cuprous chloride (0.495 part) was added, then 235 parts of allyl chloride were added during 7–8 minutes. The heat evolved by the exothermic reaction was dissipated by refluxing allyl chloride at atmospheric pressure, the reflux condenser being maintained at about 5°. The basicity of the reaction mixture decreased to pH 7 during the first twelve minutes of the run and was maintained at pH 9–10.5 during the remaining reaction period by addition of 50 parts by volume of a 50% aqueous sodium hydroxide solution. At the end of a thirty minute reaction period, the reacted mixture was cooled and allowed to stand. The oil layer of crude triallyl isocyanurate was separated from the aqueous layer. The aqueous layer was washed with a small portion of benzene to extract retained oil, and the benzene extract was added to the oil layer.

The resulting benzene solution of the product was sludge filtered and the benzene was removed by evaporation at sub-atmospheric pressure (between 400 and 500 mm. Hg). The product, triallyl isocyanurate, amounted to 107.6 parts, which corresponds to a yield of 86.6% based on cyanuric acid charged.

Diallyl isocyanurate (12.4 parts) was recovered from the extracted aqueous layer by acidification thereof to pH 1 to 2 using sulfuric acid. The solid diallyl isocyanurate, which precipitated, was recovered by filtration. The yield was 11.9%, based on the cyanuric acid charged.

*Example 2*

This example illustrates the continuous preparation of triallyl isocyanurate from allyl chloride and cyanuric acid in aqueous sodium hydroxide with the aid of a cuprous chloride catalyst at superatmospheric pressure in a closed reactor.

The reactor consisted of a vertical tube of stainless steel 304, closed at the top and bottom, and provided with external heating and cooling means and eight stirrer paddles distributed vertically on a vertical, rotating shaft mounted inside the reactor. Aqueous cyanurate solution and allyl chloride were separately fed into the bottom of the reactor, through feed-lines of said stainless steel from suitable reservoirs, by nitrogen under pressure. End to end mixing of the reaction mixture in the reactor was decreased by placing four baffle plates in the reactor and adjusting the stirrer paddles to give only a whipping action. Aqueous sodium hydroxide, used for pH control, was fed into the reactor at three openings along the side, which were also used for taking samples from the reactor. Reaction samples were collected only after operation of the reactor for a period in excess of the proposed residence time. Reaction product was removed through an outlet near the top of the reactor.

The reactor was initially charged with an alkaline aqueous cyanurate solution, containing 129 parts of sodium hydroxide, 139 parts of cyanuric acid, 1.08 parts of cuprous chloride and 1730 parts of water, and heated to an operating temperature of 65°. Then, additional cyanurate solution having the same composition was pumped into the bottom of the reactor at the rate of 66.63 parts per minute, and allyl chloride was also pumped into the bottom of the reactor at the rate of 16.5 parts per minute. Aqueous sodium hydroxide (50%) was pumped into the reactor, through the three openings along the side, at the rate of 3.33 parts per minute while maintaining the temperature at about 65°. The pressure in the reactor was 25-30 p.s.i.g. Residence time in the reactor was 30 minutes. Reaction product was removed from the reactor at the rate of 86.46 parts per minute. The oil layer of crude triallyl isocyanurate readily separated from the aqueous phase and was collected. Any remaining triallyl isocyanurate was removed from the aqueous phase by extraction with benzene, and the benzene extract was added to the oil layer.

The resulting benzene solution of the product was sludge filtered and the benzene was removed by evaporation at sub-atmospheric pressure (between 400-500 mm. Hg).

When operating at a 30 minute residence time, triallyl isocyanurate was obtained in 78% yield based on the cyanuric acid charged.

*Example 3*

*Part 1.*—A reaction vessel which was provided with a stirrer, reflux condenser and thermometer was charged with an alkaline aqueous cyanurate solution (11 parts of sodium hydroxide, 400 parts of water and 32.5 parts of cyanuric acid) and externally heated to 52° to 66°. Allyl chloride was added (49.7 parts) and heating was continued at said temperature for 4 hours and 20 minutes, producing mono- and diallyl isocyanurates. No evidence of triallyl isocyanurate formation was observed.

*Part 2.*—A brass bar suspended on a copper wire was introduced into the reaction mixture, then 140 parts of allyl chloride were added, whereupon further reaction of the allyl chloride took place with evolution of heat, which was dissipated by refluxing the allyl chloride at atmospheric pressure, the reflux condenser being maintained at about 5°. The reaction was continued for 5 hours at 65° ± 3° while maintaining the basicity of the reaction mixture at pH 10–10.5 by addition of 16.3 parts of sodium hydroxide in the form of a 23.3% aqueous sodium hydroxide solution. At the end of the reaction period, the reacted mixture was cooled and allowed to stand. The oil layer of crude triallyl isocyanurate was separated from the aqueous layer, which was washed with a small portion of heptane to extract retained oil, and the heptane extract was added to the oil layer. The resulting heptane solution of the product was dried over anhydrous $MgSO_4$, then sludge filtered, and the heptane was removed by evaporation at between 400 and 500 mm. Hg. The product, triallyl isocyanurate, amounted to 39.5 parts, which corresponds to a yield of 60.6% based on cyanuric acid charged.

Diallyl isocyanurate (6.5 parts) was recovered from the extracted aqueous layer by acidification with sulfuric acid to pH 1 to 2, and separation of the solid diallyl isocyanurate, which precipitated, by filtration. The yield was 12.4% based on the cyanuric acid charged.

*Example 4*

A reaction vessel fitted with a reflux condenser was charged with 2 parts of diallyl isocyanurate (containing a small amount of monoallyl isocyanurate as impurity) and 12 parts of water. The aqueous mixture was made alkaline to pH 10–10.5 by adding 0.3 part of 50% aqueous sodium hydroxide solution, and 0.01 part of copper powder was added as catalyst. The mixture was heated in a water bath to 50–55°, 4.5 parts of allyl chloride were added, and the reaction mixture was heated 1 hour at 50–55°. The excess allyl chloride was distilled from the mixture at 100°. A good yield of triallyl isocyanurate was obtained.

*Example 5*

The process of Example 4 was repeated with the substitution of 0.005 part of cuprous chloride for the copper powder, and heating of the reaction mixture at 50–55° for 30 minutes. A good yield of triallyl isocyanurate was also obtained.

It will be realized by those skilled in the art that changes can be made in the above examples without departing from the scope of the invention.

Thus, instead of sodium hydroxide, other alkalis may be employed, such as potassium hydroxide.

Since, as set out above, cyanuric acid can be used in the form of the free acid or its salts, e.g. alkali metal salt, the expression "cyanuric acid" as employed herein, including the claims, denotes generically the free acid and salt forms thereof.

We claim:

1. The process for making an alkenyl triester of isocyanuric acid which consists essentially of contacting at a temperature of at least 40° C. a 2-alkene-1-monochloride with an aqueous alkaline solution of a member of the group consisting of cyanuric acid, mono- and di-2-lower alkenyl isocyanuric esters, and the alkali metal salts thereof, in the presence of a small, catalytic amount of cuprous ions.

2. The process for making an alkenyl triester of isocyanuric acid which consists essentially of contacting at a temperature of at least 40° C. a 2-alkene-1-monochloride with an alkali metal salt of cyanuric acid in aqueous solution in the presence of a small, catalytic amount of cuprous ions.

3. The process for making an allyl triester of isocyanuric acid which consists essentially of contacting at a temperature of at least 40° C. allyl chloride with an alkali metal salt of cyanuric acid in aqueous solution in the presence of a small, catalytic amount of cuprous ions.

4. The process for making an allyl triester of isocyanuric which consists essentially of contacting at a temperature of about 50° C. allyl chloride with an alkaline aqueous solution of sodium cyanurate and sodium hydroxide containing a small, catalytic amount of cuprous ions.

5. The process for making an allyl triester of isocyanuric acid which consists essentially of contacting at a temperature of at least 40° C. allyl chloride with an aqueous alkaline solution of an allyl ester of isocyanuric acid containing at least one replaceable hydrogen atom in the presence of a small, catlaytic amount of cuprous ions.

References Cited in the file of this patent
UNITED STATES PATENTS

| | | |
|---|---|---|
| 2,275,467 | Pollack et al. | Mar. 10, 1942 |
| 2,296,823 | Pollack et al. | Sept. 22, 1942 |
| 2,894,950 | Lloyd et al. | July 14, 1959 |

OTHER REFERENCES

Ley et al.: Deutsche Chemische Gesellschaft, vol. 46 (part 3), page 4048 (1913).

Beilsteins Handbuch der Organischen Chemie, 4th ed., vol. 26, pages 241 to 242 (System #3889), 1937.

Smolin et al.: "S-Triazines and Derivatives," page 39, Interscience Publishers, Inc., New York, 1959.